(12) United States Patent
Tian et al.

(10) Patent No.: US 11,646,949 B2
(45) Date of Patent: May 9, 2023

(54) SERVER NODE ID ADDRESS RECOGNITION DEVICE

(71) Applicant: INSPUR SUZHOU INTELLIGENT TECHNOLOGY CO., LTD., Jiangsu (CN)

(72) Inventors: Dongshun Tian, Jiangsu (CN); Ziqiang Cheng, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/795,273

(22) PCT Filed: Feb. 24, 2021

(86) PCT No.: PCT/CN2021/077593
§ 371 (c)(1),
(2) Date: Jul. 26, 2022

(87) PCT Pub. No.: WO2022/012049
PCT Pub. Date: Jan. 20, 2022

(65) Prior Publication Data
US 2023/0043550 A1    Feb. 9, 2023

(30) Foreign Application Priority Data
Jul. 13, 2020  (CN) .......................... 202010667477.0

(51) Int. Cl.
*G06F 15/16*   (2006.01)
*G06F 9/54*    (2006.01)
(Continued)

(52) U.S. Cl.
CPC .............. *H04L 41/24* (2013.01); *H04L 61/50* (2022.05)

(58) Field of Classification Search
CPC .............................. H04L 41/24; H04L 61/50
(Continued)

(56) References Cited

U.S. PATENT DOCUMENTS

| 10,257,050 B2 * | 4/2019 | Joshi ....................... H04L 41/22 |
| 2008/0115957 A1 * | 5/2008 | Duffy ....................... H01B 7/32 |
| | | 340/815.4 |

(Continued)

FOREIGN PATENT DOCUMENTS

| CN | 101360192 A | 2/2009 |
| CN | 101594373 A | 12/2009 |

(Continued)

OTHER PUBLICATIONS

International Search Report and English Translation cited in PCT/CN2021/077593 dated May 12, 2021, 5 pages.
(Continued)

*Primary Examiner* — Hamza N Algibhah
(74) *Attorney, Agent, or Firm* — Cooper Legal Group, LLC

(57) ABSTRACT

Disclosed is a server node ID address recognition device, including: a first recognition module, arranged in a cabinet and provided with a light entrance hole and a plurality of light exit holes; a plurality of case vertical plates arranged in the cabinet, each including a light exit hole and a plurality of light entrance holes, and a number and positions of the light entrance holes in each case vertical plate are configured to be associated with an ID address; and a second recognition module arranged on a server, including a light source, the second recognition module is provided with a light exit hole and a plurality of light entrance holes corresponding to the first recognition module.

20 Claims, 3 Drawing Sheets

(51) Int. Cl.
  *H04L 29/06*    (2006.01)
  *H04L 41/00*    (2022.01)
  *H04L 61/50*    (2022.01)

(58) Field of Classification Search
  USPC ........................................................ 709/245
  See application file for complete search history.

(56) References Cited

U.S. PATENT DOCUMENTS

| | | | |
|---|---|---|---|
| 2011/0182051 A1* | 7/2011 | Sato ..................... | G02B 6/0031 |
| | | | 362/19 |
| 2015/0347259 A1* | 12/2015 | Katou ................. | G06F 11/3044 |
| | | | 348/143 |
| 2017/0063638 A1* | 3/2017 | Joshi ....................... | H04L 41/24 |
| 2017/0111248 A1* | 4/2017 | German .............. | G06F 13/4068 |
| 2017/0371716 A1 | 12/2017 | Gujar et al. | |
| 2020/0209460 A1* | 7/2020 | Achi ......................... | F21V 5/04 |

FOREIGN PATENT DOCUMENTS

| | | |
|---|---|---|
| CN | 201820172 U | 5/2011 |
| CN | 103685386 A | 3/2014 |
| CN | 109309633 A | 2/2019 |
| CN | 111315176 A | 6/2020 |
| CN | 111865677 A | 10/2020 |

OTHER PUBLICATIONS

Written Opinion and English Translation cited in PCT/CN2021/077593 dated May 12, 2021, 9 pages.
First Office Action cited in CN202010667477.0, dated Apr. 18, 2022, 7 pages.

* cited by examiner

SERVER NODE ID ADDRESS RECOGNITION DEVICE

This application claims priority to Chinese Patent Application No. 202010667477.0, filed on Jul. 13, 2020, in China National Intellectual Property Administration and entitled "Server Node ID Address Recognition Device", which is hereby incorporated by reference in its entirety.

FIELD

The present disclosure relates to the field of servers, and more particularly to a server node Identity (ID) address recognition device.

BACKGROUND

With the rapid development of the age of Information Technology (IT) and cloud computing, demands for server increase rapidly, and a more economic and efficient novel server node solution becomes a common pursuit of the industry. Integrated cabinet server with the characteristics of low cost, function integration, high modularization degree, etc., has been applied extensively to new data centers of home and abroad Internet enterprises and operators. Numerous server nodes are deployed at a high density in an integrated cabinet. In order to efficiently manage numerous integrated cabinet servers in a data center and server nodes therein, it is generally necessary to obtain positions, also referred to as server node ID addresses, of the server nodes in cabinets.

FIG. 1 is a schematic diagram of a current server node ID recognition system for an integrated cabinet. A connector A is arranged on the back of a server. A backplane is arranged at a tail end of a cabinet. Connectors B are arranged on the backplane every 1 Unit (1 U, a unit representing an outside dimension of the server) height. Different pull-up and pull-down resistors are connected to pins of the connectors B on the backplane. When the server node is mounted into the cabinet, the connector A is plugged with the connector B for connection. The server may obtain a level state of the pin of the connector B and further convert it into its own node ID.

As shown in the figure, under the limitation of a length of the backplane, nine connectors are arranged on each backplane, corresponding to a 9 U height. If five backplanes (four 9 U-height backplanes and one 8 U-height backplane) are used in a regular conventional 44 U server cabinet, each connector B on the backplane includes seven pins for ID recognition, corresponding to bits 0 to 6, wherein bits 4 to 6 are used to distinguish the five backplanes, and bits 0 to 3 are used to distinguish the nine connectors in the backplane. In such case, each 1 U slot in the 44 U cabinet has a unique ID address.

The prior art has the following shortcomings. (1) The reliability is poor. Connector contacts are abraded during each plugging and unplugging, and after the connectors are plugged and unplugged for many times, some of pins in the connectors cannot form good contact, resulting in ID address recognition errors. In addition, foreign matters such as dust accumulated in gaps of the connectors may also cause poor contact of the contacts. (2) It is difficult to implement assembling, and the connector is easy to damage. The server node is pushed into the cabinet from the front end to tail of the cabinet, and blind plugging is used in the whole process. During assembling, even though being guided by pins, the connectors are often hit to cause minor housing damage and even serious direct scrap. (3) The universality is poor. When the cabinet supports different numbers of nodes, multiple backplanes with different heights are needed to be combined for use. (4) Difficulties in implementation are high. High-precision guide pins are needed to automatically align and plug into the connectors. When an ordinary plug board and backplane are connected, the risk is relatively low. When a product with a great weight such as a server is plugged, a guide device with relatively high stress resistance is needed.

SUMMARY

In view of this, an objective of embodiments of the present disclosure is to disclose a server node ID address recognition device. A non-contact mode is used, whereby the influence of the number of times of plugging and unplugging a server node on the service life of the server node is eliminated. A non-contact optical medium is used for communication, whereby communication is unlikely to be interfered by electromagnetic signals, and the problems of contact oxidization and corrosion, etc., are solved.

Based on the above objective, an aspect of the embodiments of the present disclosure provides a server node ID address recognition device, including following components: a first recognition module, a plurality of case vertical plates, and a second recognition module. The first recognition module is arranged in a cabinet. The first recognition module is provided with a first light entrance hole and a plurality of first light exit holes.

The plurality of case vertical plates are arranged in the cabinet. Each case vertical plate includes a second light exit hole and a plurality of second light entrance holes. A number and positions of the second light entrance holes in each case vertical plate are configured to be associated with an ID address corresponding to a position of the case vertical plate in the cabinet.

The second recognition module is arranged in a server. The second recognition module includes a light source. The second recognition module is provided with a third light exit hole and a plurality of third light entrance holes corresponding to the first recognition module. The second recognition module is configured to guide light emitted by the light source through the third light exit hole of the second recognition module to the first light entrance hole of the first recognition module through the second light exit holes of the case vertical plates, and convert an optical signal returned to the third light entrance holes of the second recognition module by the first light exit holes of the first recognition module and the second light entrance holes of the case vertical plates into a digital signal to form a node ID address.

In some embodiments, the step of configuring the number and positions of the second light entrance holes in each case vertical plate to be associated with the ID address corresponding to the position of the case vertical plate in the cabinet includes: converting the ID address into a binary code, and forming the second light exit hole at a position corresponding to a first numeral of the ID address.

In some embodiments, the first recognition module includes a substrate and a light guide strip. The first light entrance hole and the plurality of first light exit holes are formed in the substrate. The light guide strip is arranged in the substrate, and is configured to communicate the first light entrance hole and the first light exit holes.

In some embodiments, the second recognition module includes a light source control circuit. The light source control circuit includes a first resistor, a triode, a second resistor, the light source, and a Baseboard Manager Controller (BMC). One end of the first resistor is connected with an input voltage. An emitter of the triode is connected with other end of the first resistor. One end of the second resistor is grounded, while other end is connected with a base of the triode. One end of the light source is grounded, while other end is connected with a collector of the triode. A General-Purpose Input/Output (GPIO) end of the BMC is connected with the base of the triode.

In some embodiments, the light source control circuit further includes a second triode. An emitter of the second triode is connected with one end of the first resistor, and a base and collector of the second triode are connected with the emitter and base of the triode respectively.

In some embodiments, the second recognition module includes an optical detection sensing circuit. The optical detection sensing circuit includes a plurality of single detection circuits. The plurality of single detection circuits are arranged in correspondence with the plurality of third light entrance holes of the second recognition module respectively, and are configured to convert the optical signal into an electrical signal.

In some embodiments, the single detection circuit includes a photosensitive diode, a third resistor, a third triode, and a fourth resistor. The third resistor is connected in series with the photosensitive diode. A base of the third triode is connected with an inverted output end of the photosensitive diode, an emitter of the third triode is connected with the GPIO end of the BMC, and a collector of the third triode is connected with the input voltage. One end of the fourth resistor is connected with one end of the third resistor, and other end of the fourth resistor is connected with an emitter of the third triode.

In some embodiments, the second recognition module includes a binary coding circuit. The binary coding circuit is provided with a plurality of input ports. The plurality of input ports correspond to the plurality of single detection circuits respectively, and are configured to convert the electrical signal into the node ID address.

In some embodiments, the second recognition module includes an Electrically Erasable Programmable Read Only Memory (EEPROM). The EEPROM is in communication connection with the BMC, and is configured to store the node ID address.

In some embodiments, a diameter of the first, second and third light entrance hole is twice that of the first, second and third light exit hole.

The present disclosure has the following beneficial technical effects. A non-contact mode is used, whereby the influence of the number of times of plugging and unplugging a server node on the service life of the server node is eliminated. A non-contact optical medium is used for communication, whereby communication is unlikely to be interfered by electromagnetic signals, and the problems of contact oxidization and corrosion, etc., are solved.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other embodiments according to these drawings without creative work.

DETAILED DESCRIPTION

In order to make the objective, technical solutions, and advantages of the present disclosure clearer, the embodiments of the present disclosure will further be described below in detail in combination with specific embodiments and with reference to the drawings.

It is to be noted that all expressions made with "first", "second", etc., in the embodiments of the present disclosure are for distinguishing two different entities or parameters with the same name, and thus it can be seen that "first" and "second" are only for ease of description and should not be understood as limitations on the embodiments of the present disclosure. No descriptions are made thereto in the following embodiments.

An integrated cabinet server is an independent product formed by integrating architectures with separate racks and servers, and is a server set taking cabinet as a minimum delivery unit. After summarization and image modeling by technical means at a data center manager, the number and positions of servers of the whole data center may be queried and displayed. A server space utilization, vacancy rate, unit operating cost, and other data of the data center may also be calculated statistically. In addition, a management unit of the integrated cabinet may manage/maintain a certain server based on a server node ID without any influence on operation of the other servers. The above functions are realized on the premise that server nodes may obtain their own ID addresses stably.

The present disclosure discloses a server node ID address recognition device. ID address recognition of a server node in an integrated cabinet is implemented in a non-contact mode by taking light as a transmission medium.

Figure 1:
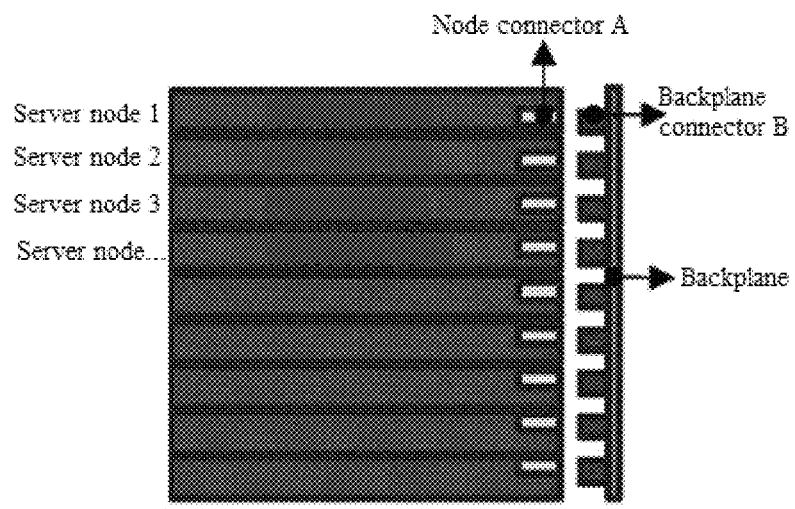
FIG. 1 is a schematic diagram of an integrated cabinet server node ID recognition system according to the prior art.
Figure 2:
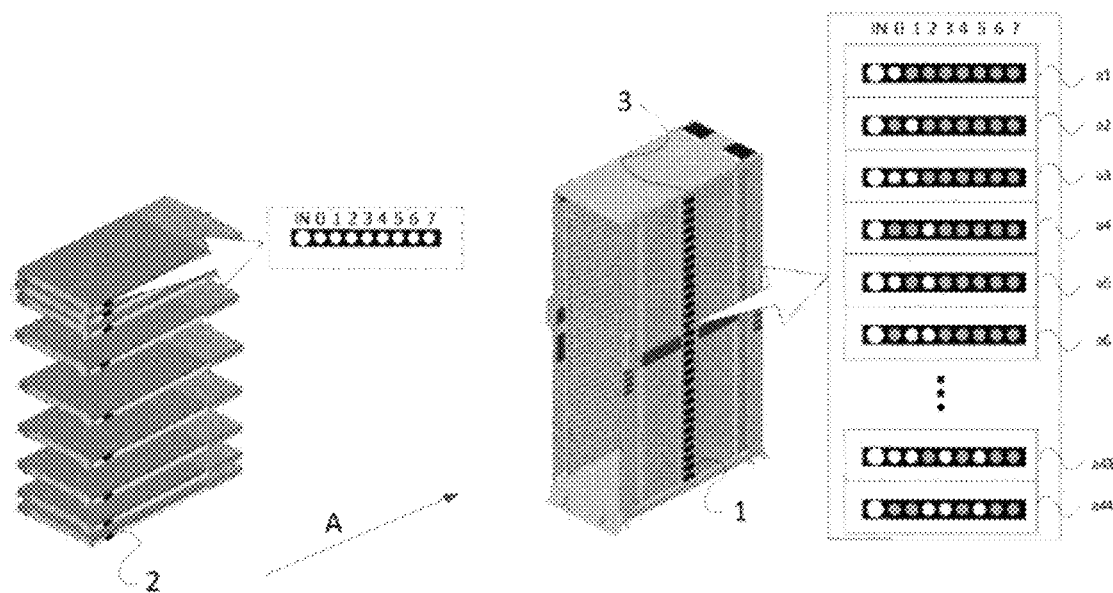
FIG. 2 is an overall schematic architecture diagram of an embodiment of a server node ID address recognition device according to the present disclosure.
Figure 3:
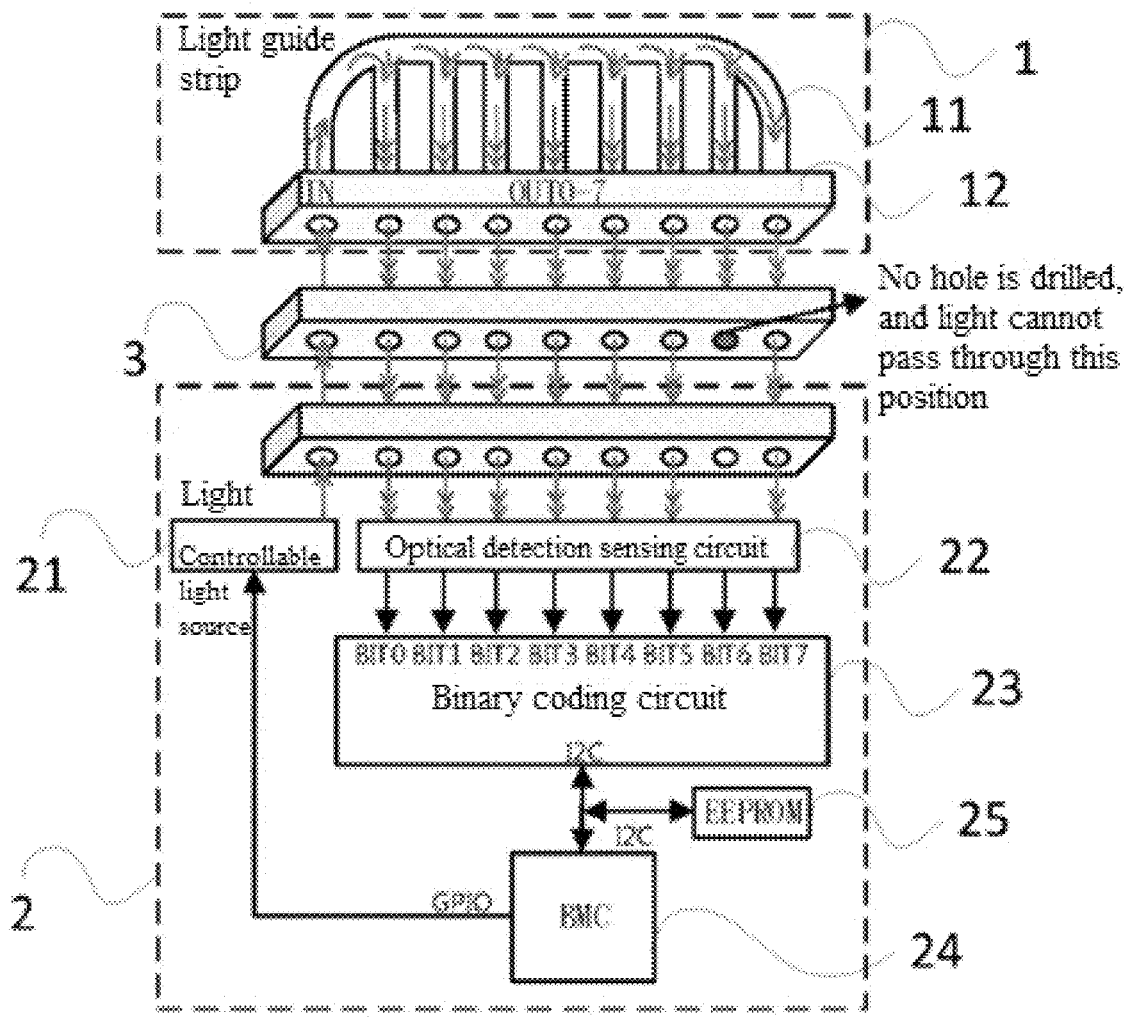
FIG. 3 is a detailed schematic diagram of an embodiment of a server node ID address recognition device according to the present disclosure.

Based on the above objective, a first aspect of the embodiments of the present disclosure discloses an embodiment of a server node ID address recognition device. FIG. 2 is an overall schematic architecture diagram of an embodiment of a server node ID address recognition device according to the present disclosure. FIG. 3 is a detailed schematic diagram of an embodiment of a server node ID address recognition device according to the present disclosure. In combination with FIGS. 2 and 3, the embodiment of the present disclosure includes the following components:

a first recognition module 1, wherein the first recognition module 1 is arranged in a cabinet, and the first recognition module 1 is provided with a first light entrance hole and a plurality of first light exit holes;

a plurality of case vertical plates 3, wherein the plurality of case vertical plates 3 are arranged in the cabinet, each case vertical plate 3 includes a second light exit hole and a plurality of second light entrance holes, and a number and positions of the second light entrance holes in each case vertical plate 3 are configured to be associated with an ID address corresponding to a position of the case vertical plate 3 in the cabinet; and a second recognition module 2, wherein the second recognition module 2 is arranged in a server, the second recognition module includes a light source 21, the second recognition module 2 is provided with a third light exit hole and a plurality of third light entrance holes corresponding to the first recognition module 1, and the second recognition module 2 is configured to guide light emitted by the light source through the third light exit hole of the second recognition module to the first light entrance hole of the first recognition module 1 through the second light exit holes of the case vertical plates 3, and convert an optical signal returned to the third light entrance holes of the second recognition module 2 by the first light exit holes of the first recognition module 1 and the second light entrance holes of the case vertical plates 3 into a digital signal to form a node ID address.

As shown in FIG. 2, when the server is plugged into the cabinet from a direction shown by A, the second recognition module 2 and the first recognition module 1 are mirrored in position, the first recognition module 1 and the second recognition module 2 fit closely, and a shading felt strip may be used at a junction so as to prevent an external light source from interfering a detection result of the second recognition module 2.

As shown in FIG. 3, light generated by the light source 21 in the second recognition module 2 enters the cabinet vertical plates 3 from the third light exit hole of the second recognition module 2, and enters the first light entrance hole IN of the first recognition module 1 from the light exit holes of the case vertical plates 3. In the present embodiment, descriptions are made taking eight light exit holes as an example. However, the number of the light exit holes is not limited thereto, and in another embodiment, may be correspondingly adjusted according to the bit number of the ID address. Each 1 U node position corresponds to a first recognition module 1. Each vertical plate is drilled at a position corresponding to each server node to form an IN hole and one to eight OUT holes. A drilling rule is that binary codes increase progressively from top to bottom. As shown in FIG. 2, white represents drilling, and gray represents no drilling.

In some embodiments, the step of configuring a number and positions of the second light entrance holes in each case vertical plate to be associated with an ID address corresponding to a position of the case vertical plate in the cabinet includes: converting the ID address into a binary code, and forming the second light exit hole at a position corresponding to a first numeral of the ID address. Referring back to FIG. 2, the server cabinet is of a general model, and supports at most 44 1 U nodes. The vertical plate is divided into 44 1 U-height intervals from top to bottom, an 8 bits binary coding mode is used, and 00000001 to 00101100 increase sequentially. An ID corresponding to a1 in FIG. 2 is 00000001, and the second light exit hole may be formed at a position corresponding to numeral 1. Since the first recognition module 1 and the second recognition module 2 are mirrored, and the case vertical plate 3 is arranged in the cabinet, the position corresponding to numeral 1 is the leftmost end.

In some embodiments, the first recognition module 1 includes a substrate 12 and a light guide strip 11. The first light entrance hole and the plurality of first light exit holes are formed in the substrate 12. The light guide strip 11 is arranged on the substrate 12, and is configured to communicate the first light entrance hole and the first light exit holes.

In some embodiments, a diameter of the light entrance hole is twice that of the light exit hole. The light enters the first recognition module 1 from the first light entrance hole, and is output from the eight first light exit holes. In order to increase a light intensity of the first light entrance hole, a diameter of the first light entrance hole should be larger than that of the first light exit hole, and in the present disclosure, is designed to be twice that of the first light exit hole.

A light guide material may be a PolymethylMethacrylate (PMMA) or Polycarbonate (PC) material with high light transmittance (>90%) and low refractive index, thereby reducing light decay in the module.

Figure 4:
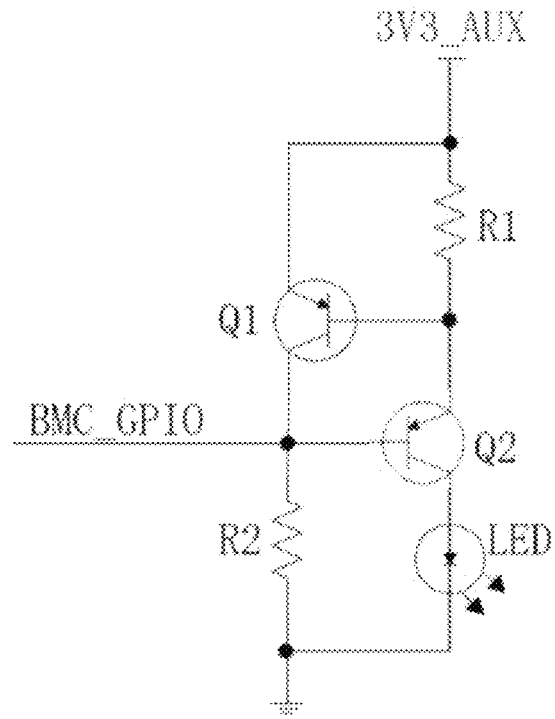
FIG. 4 is a schematic diagram of a light source control circuit of a server node ID address recognition device according to the present disclosure.

FIG. 4 is a schematic diagram of a light source control circuit of a server node ID address recognition device according to the present disclosure. As shown in FIG. 4, in some embodiments, the second recognition module 2 includes a light source control circuit. The light source control circuit includes a first resistor R1, a triode Q2, a second resistor R2, the light source Light-Emitting Diode (LED), and a Baseboard Manager Controller (BMC). One end of the first resistor R1 is connected with an input voltage (3V3_AUX (3V3 auxiliary)). An emitter of the triode Q2 is connected with the other end of the first resistor RE One end of the second resistor R2 is grounded, while the other end is connected with a base of the triode Q2. One end of the light source LED is grounded, while the other end is connected with a collector of the triode Q2. A GPIO end of the BMC is connected with the base of the triode. The light source may be an ultra-bright straw-hat round-headed LED with a diameter of 5 millimeter (mm), which has the advantages of high brightness, low light decay, and low heat. The GPIO end of the BMC outputs a high level to turn on the triode Q2, thereby enabling the light source to emit light.

In some embodiments, the light source control circuit further includes a second triode Q1. An emitter of the second triode Q1 is connected with one end of the first resistor R1, and a base and collector of the second triode Q1 are connected with the emitter and base of the triode respectively.

In some embodiments, the second recognition module includes an optical detection sensing circuit. The optical detection sensing circuit includes a plurality of single detection circuits. The plurality of single detection circuits are arranged in correspondence with the plurality of third light entrance holes respectively, and are configured to convert the optical signal into an electrical signal.

Figure 5:
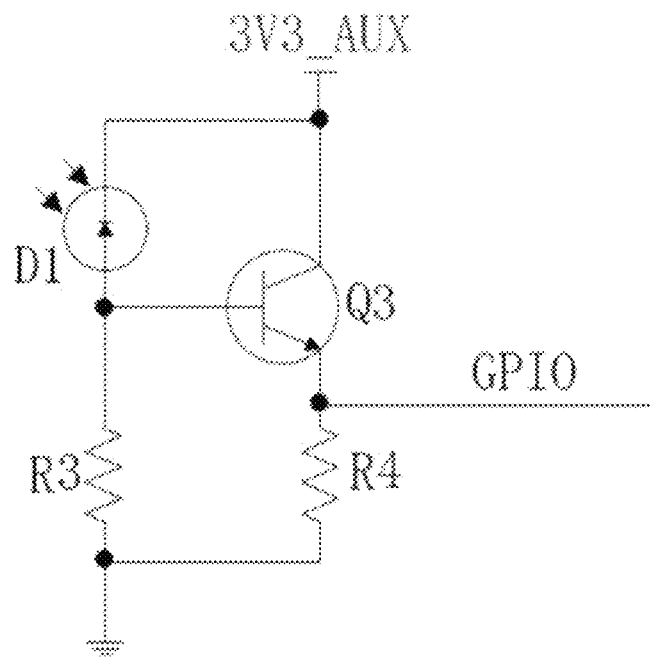
FIG. 5 is a schematic diagram of a single detection circuit of a server node ID address recognition device according to the present disclosure.

FIG. 5 is a schematic diagram of a single detection circuit of a server node ID address recognition device according to the present disclosure. As shown in FIG. 5, in some embodiments, the single detection circuit includes a photosensitive diode D1, a third resistor R3, a third triode Q3, and a fourth resistor R4. The third resistor R3 is connected in series with the photosensitive diode D1. A base of the third triode Q3 is connected with an inverted output end of the photosensitive diode D1, an emitter of the third triode Q3 is connected with the GPIO end of the BMC, and a collector of the third triode Q3 is connected with the input voltage (3V3_AUX). One end of the fourth resistor R4 is connected with one end of the third resistor R3, and the other end of the fourth resistor R4 is connected with an emitter of the third triode Q3.

A photosensitive device may be used as an optical detection sensor, such as photosensitive resistor, photosensitive diode, and photosensitive triode infrared pyroelectric sensors. In the present disclosure, a photosensitive diode is used. In the present disclosure, eight groups of module circuits are used. A working principle is as follows: when light irradiates the photosensitive diode D1, a reverse current increases, the third triode Q3 is turned on, and a level of the GPIO end is high. On the contrary, when no light is detected, the photosensitive diode D1 is in a high-resistance state (resistance is far higher than that of R3), the third triode Q3 is turned off, and the level of the GPIO end is low.

In some embodiments, the second recognition module includes a binary coding circuit. The binary coding circuit is provided with a plurality of input ports. The plurality of input ports correspond to the plurality of single detection circuits respectively, and are configured to convert the electrical signal into the node ID address. A binary coding chip may use PCA9554. Eight GPIO ports of the chip are configured in an input mode to obtain level states of the optical detection circuits. The eight GPIO ports are connected to bits 0 to 7 in the optical detection circuits respectively. An Inter-Integrated Circuit ($I^2C$) (a bidirectional two-wire synchronous serial bus) interface is connected to the BMC. The BMC operates PCA9554 to obtain the level states of the eight optical detection circuits and further convert them into the node ID address.

In some embodiments, the second recognition module includes an EEPROM. The EEPROM is in communication connection with the BMC, and is configured to store the node ID address.

The BMC controls the GPIO end to turn on the LED. Light is emitted by the second recognition module 2, and reaches the first recognition module 1 through the second light exit holes of the case vertical plates 3. The first recognition module 1 guides and scatters the light into eight paths for output to the case vertical plates 3. At positions of the case vertical plates 3 where the second light entrance holes are formed, the light is allowed to reach the second recognition module 2. At positions where no second light entrance holes are formed, the light is blocked and cannot reach the second recognition module 2. The BMC obtains the states of the eight optical detection circuits, and converts the states into an 8 bits node ID for storage in a memory region of the EEPROM. After storing the node ID address, the BMC turns off the LED, thereby saving electrical energy. After being obtained, the ID address is compared with an ID address stored last time. If the addresses are different, the BMC stores the newly obtained ID address and a timestamp in the EEPROM, and simultaneously reports alarm information "the server node ID address changes from xxx to . . . " to a computer room maintenance front-end through a maintenance interface, such that a worker of the computer room statistically obtains server position change information.

The present disclosure has the following beneficial effects and improvements.

(1) Convenience is brought to assembly. The two modules for ID address recognition are mounted to a cabinet sidewall vertical plate and a case sidewall of a server node respectively. When the server node is plugged into the cabinet, collisions between the two modules are avoided. The module 1 includes a specially designed light guide strip, and no external power supply or cable is needed, so that more convenience is brought to assembly.

(2) The service life is long. The ID recognition module uses a non-contact mode, whereby the influence of the number of times of plugging and unplugging the server node on the service life of the server node is eliminated.

(3) The working performance is stable. A non-contact optical medium is used for communication, whereby communication is unlikely to be interfered by electromagnetic signals, and the problems of contact oxidization and corrosion, etc., are solved.

(4) An alarm is given after the ID address changes. When the position of the server node changes, server address change details are reported actively, such that the worker of the computer room statistically obtains the server position change information, and errors may also be avoided when the mounting position of the server is restored during computer room maintenance.

(5) The BMC may turn off the LED light source after completing ID address recognition. Therefore, the system electric energy consumption may be reduced.

The above is the exemplary embodiment disclosed in the present disclosure. However, it is to be noted that various variations and modifications may be made without departing from the scope defined by the claims and disclosed by the embodiments of the present disclosure. The functions, steps, and/or actions in the method claims according to the disclosed embodiments described herein are not required to be executed in any specific sequence. In addition, the element disclosed in the embodiments of the present disclosure may be described or required in form of an individual, but may be understood as multiple, unless clearly limited to only one.

It is to be understood that, as used herein, the singular form "a/an" is intended to include the plural form also, unless exceptional cases are supported clearly in the context. It is also to be understood that "and/or" used herein refers to including any or all possible combinations of one or more than one items that is listed associatively.

The sequence numbers of the embodiments of the present disclosure are only for description and do not represent superiority-inferiority of the embodiments.

It can be understood by those ordinarily skilled in the art that all or part of the steps of the above-mentioned embodiments may be completed by hardware, or by a program by instructing related hardware. The program may be stored in a computer-readable memory medium. The above-mentioned memory medium may be a read-only memory, a magnetic disk, an optical disk, or the like.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

What is claimed is:

1. A server node Identity (ID) address recognition device, characterized by comprising following components:
   a first recognition module, wherein the first recognition module is arranged in a cabinet, and the first recognition module is provided with a first light entrance hole and a plurality of first light exit holes;
   a plurality of case vertical plates, wherein the plurality of case vertical plates are arranged in the cabinet, each case vertical plate comprises a second light exit hole and a plurality of second light entrance holes, and a number and positions of the second light entrance holes in each case vertical plate are configured to be associated with an ID address corresponding to a position of the case vertical plate in the cabinet; and a second recognition module, wherein the second recognition module is arranged in a server, the second recognition module comprises a light source, the second recognition module is provided with a third light exit hole and a plurality of third light entrance holes corresponding to the first recognition module, and the second recognition module is configured to guide light emitted by the light source through the third light exit hole of the second recognition module to the first light entrance hole of the first recognition module through the second light exit holes of the case vertical plates, and convert an optical signal returned to the third light entrance holes of the second recognition module by the first light exit holes of the first recognition module and the second light entrance holes of the case vertical plates into a digital signal to form a node ID address.

2. The device according to claim 1, wherein the step of configuring the number and positions of the second light entrance holes in each case vertical plate to be associated with the ID address corresponding to the position of the case vertical plate in the cabinet comprises:

converting the ID address into a binary code, and forming the second light exit hole at a position corresponding to a first numeral of the ID address.

3. The device according to claim 1, wherein the first recognition module comprises:

a substrate, wherein the first light entrance hole and the plurality of first light exit holes are formed in the substrate; and a light guide strip, wherein the light guide strip is arranged in the substrate, and is configured to communicate with the first light entrance hole and the first light exit holes.

4. The device according to claim 1, wherein the second recognition module comprises a light source control circuit, and the light source control circuit comprises:

a first resistor, wherein one end of the first resistor is connected with an input voltage;

a first triode, wherein an emitter of the first triode is connected with other end of the first resistor;

a second resistor, wherein one end of the second resistor is grounded, while other end is connected with a base of the first triode;

the light source, wherein one end of the light source is grounded, while other end is connected with a collector of the first triode; and a Baseboard Manager Controller (BMC), wherein a General-Purpose Input/Output (GPIO) end of the BMC is connected with the base of the first triode.

5. The device according to claim 4, wherein the light source control circuit further comprises:

a second triode, wherein an emitter of the second triode is connected with the one end of the first resistor, and a base and a collector of the second triode are connected with the emitter and the base of the first triode respectively.

6. The device according to claim 4, wherein the second recognition module comprises:

an optical detection sensing circuit, wherein the optical detection sensing circuit comprises a plurality of single detection circuits, and the plurality of single detection circuits are arranged in correspondence with the plurality of third light entrance holes of the second recognition module respectively, and are configured to convert the optical signal into an electrical signal.

7. The device according to claim 6, wherein each of the plurality of single detection circuit comprises:

a photosensitive diode;

a third resistor, wherein the third resistor is connected in series with the photosensitive diode;

a third triode, wherein a base of the third triode is connected with an inverted output end of the photosensitive diode, an emitter of the third triode is connected with the GPIO end of the BMC, and a collector of the third triode is connected with the input voltage; and a fourth resistor, wherein one end of the fourth resistor is connected with one end of the third resistor, and other end of the fourth resistor is connected with the emitter of the third triode.

8. The device according to claim 6, wherein the second recognition module comprises:

a binary coding circuit, wherein the binary coding circuit is provided with a plurality of input ports, and the plurality of input ports correspond to the plurality of single detection circuits respectively, and are configured to convert the electrical signal into the node ID address.

9. The device according to claim 4, wherein the second recognition module comprises:

an Electrically Erasable Programmable Read Only Memory (EEPROM), wherein the EEPROM is in communication connection with the BMC, and is configured to store the node ID address.

10. The device according to claim 1, wherein a diameter of the first light entrance hole, the second light entrance hole, and the third light entrance hole is twice that of the first light exit holes, the second light exit holes and the third light exit hole.

11. The device according to claim 1, wherein the second recognition module and the first recognition module are mirrored in position.

12. The device according to claim 11, wherein the second recognition module and the first recognition module fit closely.

13. The device according to claim 12, wherein a shading felt strip is used at a junction so as to prevent an external light source from interfering with a detection result of the second recognition module.

14. The device according to claim 3, wherein a light guide material is a PolymethylMethacrylate (PMMA) or Polycarbonate (PC) material with a light transmittance over 90% and low refractive index.

15. The device according to claim 1, wherein the light source is an ultra-bright straw-hat round-headed light emitting diode (LED) with a diameter of 5 millimeter.

16. The device according to claim 7, wherein the photosensitive diode is configured to be replaced with a photosensitive resistor or a photosensitive triode infrared pyroelectric sensor.

17. The device according to claim 8, wherein the binary coding circuit is a binary coding chip.

18. The device according to claim 17, wherein the binary coding chip is a type of PCA9554.

19. The device according to claim 18, wherein the PCA9554-type binary coding chip is operated to obtain level states of the single detection circuits and further convert the level states into the node ID address.

20. The device according to claim 9, wherein the BMC controls the GPIO to turn on a light emitting diode (LED).

* * * * *